Inventor,
Thomas J. McKey
By Barber & Latta
Attorneys

Inventor,
THOMAS J. McKEY
By Barbee & Latta
Attorneys

July 7, 1970

T. J. McKEY 3,519,300

TAIL GATE LATCH MECHANISM

Filed Aug. 8, 1968

Inventor,
THOMAS J. McKEY
By Barbee & Latta
Attorneys

United States Patent Office 3,519,300
Patented July 7, 1970

3,519,300
TAIL GATE LATCH MECHANISM
Thomas J. McKey, Grosse Pointe, Mich., assignor to American Motors Corporation, Kenosha, Wis., a corporation of Maryland
Filed Aug. 8, 1968, Ser. No. 751,175
Int. Cl. E05c 3/10
U.S. Cl. 292—216  10 Claims

ABSTRACT OF THE DISCLOSURE

A mechanism for selectively operating a vehicle tail gate about either a pair of horizontal hinges or generally vertical hinges. The mechanism including a forked rotor for engaging a vehicle mounted striker, a pawl engaging the rotor, a pair of handle actuated levers with a link therebetween constructed to selectively release the pawl. Actuation of one handle blocking movement of the other handle and vice versa due to slotted connection between the mechanism plate, pawl and link. Actuation of one handle opening the latch mechanism and also the upper left latchable hinge for opening the tail gate about the horizontal hinges. Actuation of the other handle opening the latch mechanism and also the lower right latchable hinge for opening the tail gate about the vertical hinges.

BACKGROUND OF THE INVENTION

Field of the invention

This invention pertains to a mechanism for the selective operation of a vehicle tail gate about a horizontal or a generally vertical axis.

Description of the prior art

The conventional dual action station wagon tail gate allows the tail gate to be lowered about a horizontal axis to provide a horizontal position as an extension of the floor cargo area. The tail gate can also be opened about a generally vertical axis as a door to permit access by passengers into the station wagon. Normally the dual action is accomplished by providing a lower hinge at the left rear of the station wagon (when facing the rear of same) that has horizontal and vertical hinge pins. The upper left hinge for door operation is also latchable to allow movement of the tail gate to the horizontal position. The lower right support may be a latchable hinge or a lock doubling as a hinge. The tail gate is opened as a door by actuation of the upper right latch mechanism through a suitable outside handle and as a conventional tail gate by movement of a centrally located inside handle. Movement of the outside handle opens the right lower latchable hinge and the upper right mechanism while operation of the inside handle opens the upper left latchable hinge and the upper right mechanism.

Inasmuch as the tail gate is normally not a full door, the glass therefor is movable into suitable channels in the upper body. Consequently, to open the tail gate to either position requires the previous lowering of the window glass into the tail gate. When the glass is in the down position either the inside or outside handle can be operated.

A necessary feature of a dual action type tail gate is the provision for selective operation of either handle. Thus, if the tail gate is already open as a door, the inside handle cannot be actuated otherwise the tail gate will be left supported solely by the lower left hinge. Because of the weight of the tail gate this would cause damage to same or to the station wagon. Similarly if the tail gate is in the open position as a drop gate for the extension of the cargo area the outside handle cannot be actuated lest the tail gate be left hanging on the lower left hinge. Of course provision must also be made to prevent simultaneous actuation of both handles.

Heretofore, the conventional tail gate latch mechanism has included a double jawed type latch which squeezes a vehicle mounted striker. In addition to being more complex and costly, the jaws can easily be closed by use of a person's fingers with the tail gate in either open position. This makes possible the actuation of either handle with the aforementioned results.

SUMMARY OF THE INVENTION

Applicant's latch mechanism is designed to incorporate suitable blocking features to provide selective operation of the handles and the associated linkages. Further, simultaneous movement of both handles is prevented.

Specifically, applicant's design for the upper right latch mechanism incorporates a fork type rotor for engaging a suitable, generally cylindrical striker or keeper mounted on the vehicle. The rotor which is spring loaded to the open position has detents engageable by a spring loaded, rotatably mounted pawl. The pawl is preferably mounted on the mechanism base plate at approximately 90° to the rotor which is also mounted thereon. The base plate has an opening therein having slotted generally horizontal and vertical portions. A first lever is rotatably mounted on the side of plate opposite the pawl as is the second lever. Connecting the levers in pivotal fashion is a link. One end of the link is attached as by a rivet to the second lever, the plate and the slotted aperture pawl. The rivet moves in aforementioned plate opening thereby selectively moving the pawl depending on the lever actuated. Of course movement of the rivet into a portion of the opening prevents further movement of the other lever. Simultaneous movement of the levers is prevented as the rivet has to move to either portion of the opening before the rotor is released for rotation. Suitable handle assemblies are provided for the actuation of the levers and the associated upper left and lower right latchable hinges.

Both levers are located on one side of the plate inasmuch as the associated handles are both located inside the vehicle. The handle for door type operation being located on the inner and upper right side of the tail gate and for conventional operation on the inner, central part of the tail gate. To operate either handle also requires the previous lowering of the tail gate glass into the tail gate. This is accomplished by providing a key actuated power window or a manual window control incorporating a key cylinder that must be opened before the window can be rolled down.

While conceivably various arrangements could be devised to perform all of the functions of applicant's latch mechanism, it is felt that applicant has provided a unique design incorporating such a small number of parts that it is particularly economical to manufacture.

It is therefore an object of this invention to provide a new and improved tail gate latch mechanism for a dual action tail gate.

Another object of this invention is to provide a tail gate latch mechanism for a dual action tail gate that provides selective action of the mechanism therefor to pivot the tail gate on a horizontal or generally vertical axis.

DESCRIPTION OF THE PREFERRED EMBODIMENT

Figure 1:
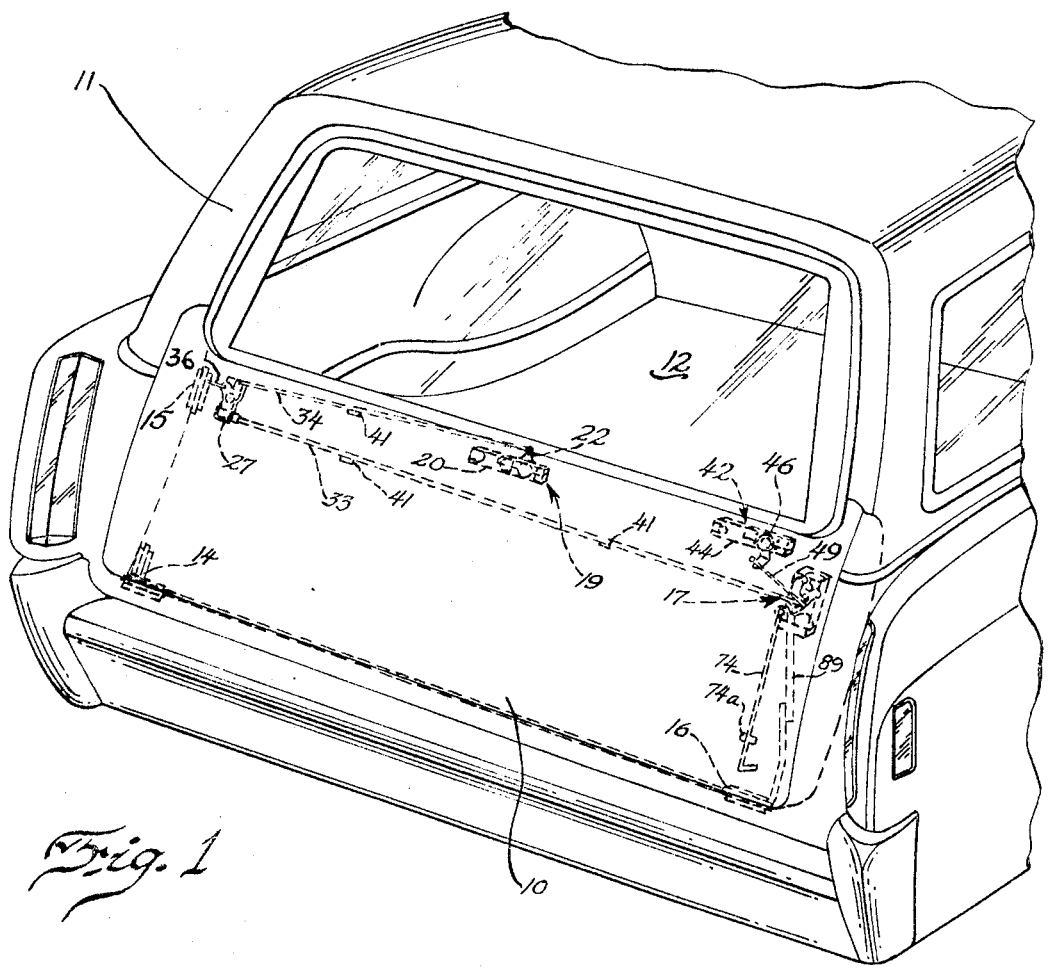
FIG. 1 is a perspective view of the rear of a station wagon having a dual action type tail gate that employs the novel latch mechanism of this invention with the lower left dual axis hinge and the upper left and lower right latchable hinges only shown schematically as they do not form a part of this invention.
Figure 6:
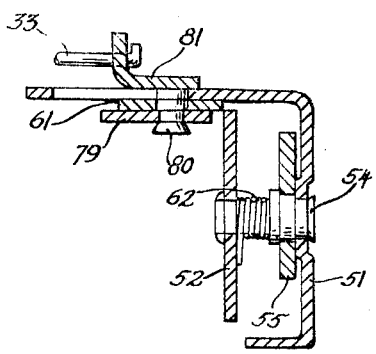
FIG. 6 is a sectional view taken along line 6—6 of FIG. 3.
Figures 2, 3:
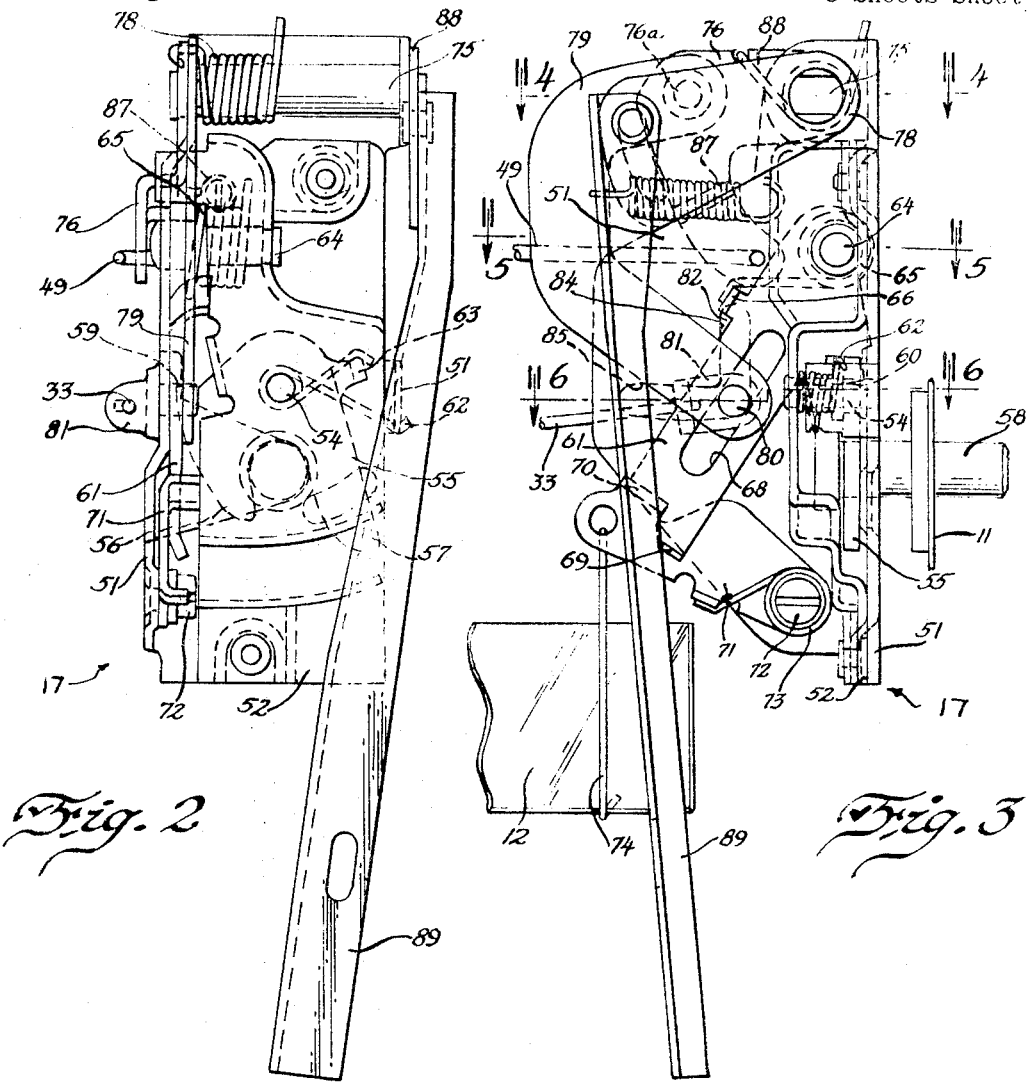
FIG. 2 is a left side view of the upper right tail gate latch mechanism of this invention with the vehicle tail gate not shown in the interest of clarity.
FIG. 3 is an end view, similar to that shown in FIG. 1, of the upper right tail gate latch mechanism in the closed position with the tail gate and the vehicle, except for the striker, not shown.
Figure 4:
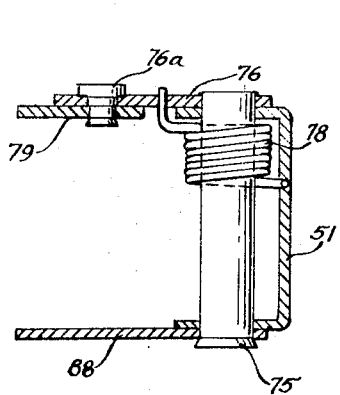
FIG. 4 is a sectional view taken along line 4—4 of FIG. 3.
Figure 5:
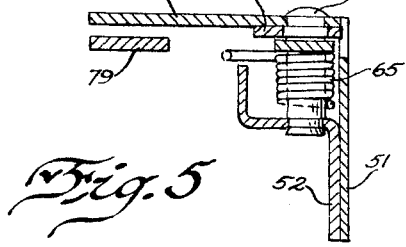
FIG. 5 is a sectional view taken along line 5—5 of FIG. 3.
Figure 7:
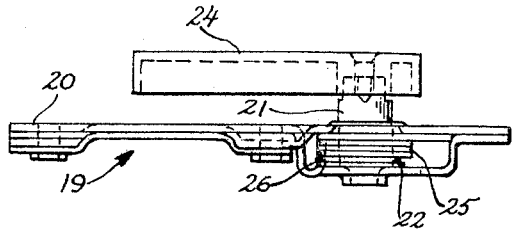
FIG. 7 is an enlarged plan view of the central handle assembly (isolated from the tail gate) for operation of the upper left latchable hinge and upper right latch mechanism.

Referring to FIG. 1, 10 indicates a dual action tail gate for station wagon 11. Tail gate 10 has glass 12 which is movable between the tail gate and the upper portion of the body of wagon 11. Tail gate 10 is mounted on wagon 11 for movement about a horizontal axis as a standard tail gate and about a generally vertical axis as a door. The action about either axis is accomplished by means of lower left hinge 14, upper left latchable hinge 15, lower right latchable hinge 16 and upper right latch mechanism 17.

The lower left hinge 14, and upper left and lower right latchable hinges 15 and 16 respectively, are only shown schematically as they do not form a part of this invention. Lower left hinge 14 has a pair of hinge pins which are parallel to the aforementioned axes which permit movement of the tail gate thereabout. Upper left latchable hinge 15 has a generally vertical hinge pin that permits movement of the tail gate 10 thereabout when used as a door, and yet may be unlatched for the horizontal positioning of tail gate 10. Lower right latchable hinge 16 has a somewhat similar construction as hinge 15 except that the pin is located in a horizontal position.

The control system for operating the tail gate 10 about a horizontal axis (see FIGS. 1, 7, 8 11 and 12) includes a first remote control assembly 19. Assembly 19 incorporates a bracket 20 to be fixedly mounted on the interior of the tail gate 10. A stud 21 is rotatably mounted in bracket 20 and fixedly attached to stud 21 is arm 22. First remote handle 24 is fixedly attached to stud 21, where same extends into the passenger compartment, for rotation thereof. Spring 25 connected between arm 22 and bracket 20 biases arm 22 and therefore handle 24 toward the neutral position shown. Projection 26 in bracket 20 provides a stop for arm 22.

Also a part of remote control assembly 19 (see FIGS. 1, 11 and 12) is bellcrank type assembly 27. Assembly 27 incorporates a bracket 28 to be mounted on the interior of tail gate 10. Fixedly mounted in bracket 28 is stud 29. Rotatably mounted on stud 29 is arm 30. Arm 30 has a lower portion 31 having a serrated under surface. Extension 32 has a slotted hole therein and a serrated surface and is adapted to be adjustably connected by a suitable capscrew to lower portion 31 of arm 30. Extension 32 also has a hole therein for rod 33 (which may be a wire) that connects assembly 27 and upper right latch mechanism 17. Arm 30 also has a hole therein in the upper portion for rod 34 which extends therefrom to arm 22 of the other portion of remote control assembly 19. Rotatably mounted on stud 29 is arm 35. Arm 35 has a hole therein for rod 36 which also may be a wire. Rod 36 connects arm 35 to upper left latchable hinge 15. Spring 38 which is connected to stud 29 and arm 35 biases same toward a neutral position. Spring 39, also connected to stud 29 provides the same function in regard to arm 30. Projector 37 on arm 30 provides a stop in conjunction with bracket 28. Arm 30 has a flange 40 adapted to contact and move arm 35 upon opening movement of arm 30. Strong spring 38 moves both arms 35 and 30 toward a neutral position. In the actual latching operation arm 35 and rod 36 will be moved individually against spring 38 to allow latching of mechanism 15. Spring 39 then will move arm 30 toward a neutral position upon latching operation of mechanism 17 to striker 58.

From the above construction, it is readily apparent that movement of remote handle 24 upward, rotates arm 22. Rod 34 connected to arm 22 therefor moves arm 30 which has a flange 40 thereon which contacts and consequently moves arm 35. Rod 36 connected to arm 35 therefore is placed under tensidn and opens upper left latchable hinge 15. Simultaneously, extension 32 is rotated placing rod 33 under tension and opening upper right latch mechanism 17. Springs 38 and 39 return arms 30 and 35 toward the neutral position upon release of handle 24 while spring 25 performs a similar function in regard to handle 24. Rods 33 and 36 may be connected to upper right latch mechanism 17 and upper left latchable hinge 14 by lost motion connections. To prevent rattles of rods 33 and 36, clips 41 are mounted on the tail gate inner panel to provide a lateral bias thereto to deflect the wires from a straight line position (see FIG. 1).

Figure 9:
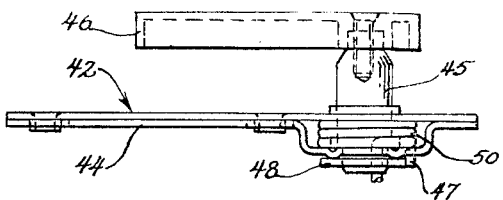
FIG. 9 is an enlarged plan view of the right handle assembly (isolated from the tail gate) for operation of the upper right latch mechanism and the lower right latchable hinge.
Figure 8:
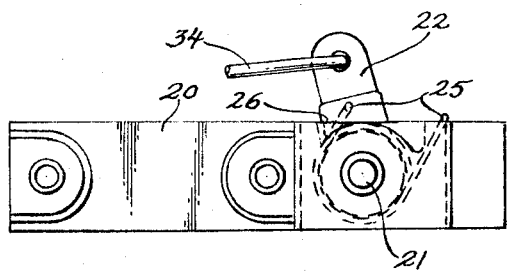
FIG. 8 is an end view of the handle assembly of FIG. 7.
Figure 10:
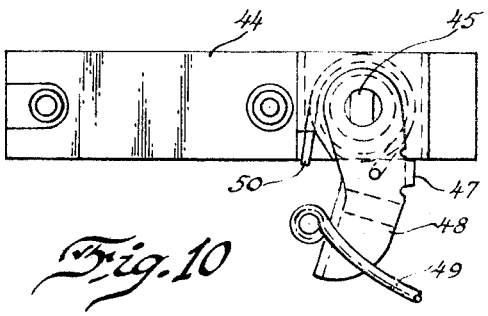
FIG. 10 is an end view of the handle assembly of FIG. 9.
Figure 11:
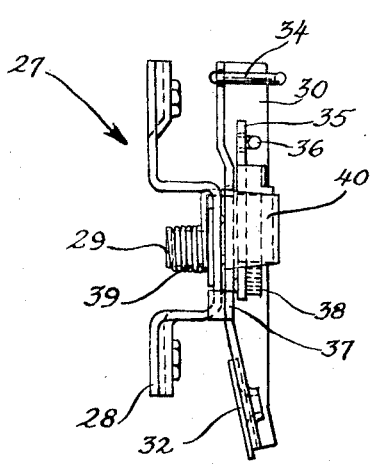
FIG. 11 is an enlarged side view of the bellcrank assembly (isolated from the tail gate) associated with the central handle assembly.
Figure 12:
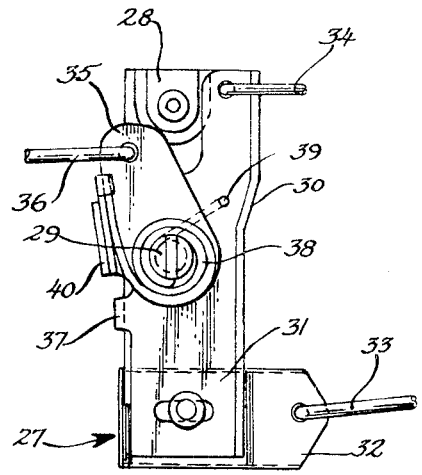
FIG. 12 is an end view of the bellcrank assembly of FIG. 11.

The control system (see FIGS. 1, 9 and 10) for operating the tail gate 10 about a vertical axis includes a second remote control assembly 42. Assembly 42 incorporates a bracket 44 to be fixedly mounted on the interior of tail gate 10. Stud 45 is rotatably mounted on bracket 44 and has one end extending into the passenger area for connection and actuation by a second handle 46. Fixedly attached to stud 45 is arm 48. Arm 48 has a hole for the connection thereto of rod 49 which also is connected to upper right latch mechanism 17. A spring 50 connected between bracket 44 and arm 48 biases arm 48 and therefore handle 46 toward the neutral position shown. Flange 47 on arm 48 provides a stop in conjunction with bracket 44. Inasmuch as latch mechanism 17 is also connected to lower right latchable hinge 16, movement of handle 46 will unlatch both assemblies thereby allowing the tail gate to swing open as a door about upper left hinge 15 and lower left hinge 14.

Referring to FIGS. 2 through 6, the upper right latch mechanism 17 of this invention is shown in detail. Mechanism 17 includes L-shaped plate 51 and cover 52 affixed thereto by welding and by screws which also attach the mechanism to the tail gate inner panel. Shaft 54 extends between plate 51 and cover 52 and is rigidly atached therebetween. Forked rotor 55 is rotatably mounted on shaft 54 between the cover and the plate. Rotor 55 has prongs or tines 56 and 57 for engaging therebetween cylindrical striker 58 fixedly attached to station wagon 11. Plate 51 has a suitable passage for the movement therein of striker 58. Rotor 55 also has a detent 59 for engagement by a pawl detent 60 of pawl 61 mounted at 90° to rotor 55 when the pawl 61 is in the fully latched position relative to striker 58. Pawl 61 may also have a second detent for providing a safety latch position. Urging rotor 55 to the unlatched position is spring 62 extending between a tab 63 or rotor 55 and a portion of plate 51.

Pawl 61 is rotatably mounted on pin 64 extending between plate 51 and cover 52 and rigid therewith. Spring 65 extends between tab 66 on pawl 61 and cover 52 for urging pawl 61 to the latched position. Pawl 61 has a generally longitudinally extending slotted aperature 68 and a tab 69. Tab 69 is engageable by a corresponding tab 70 of lever 71 rotatably mounted via rivet 72 on plate 51. Spring 73 connected to rivet 72 urges lever 71 into a blocking position relative to pawl 61. Rod 74, journalled in suitable bearing means 74a attached to gate 10, extends through a hole in lever 71 and downward to engage glass 12 of tail gate 10. When the glass 12 is in a lowered position, it pulls rods 74, freeing pawl 61 from lever 71 and thereby permitting the unlatching of mechanism 17.

Rotatably mounted on plate 51 is shaft 75. Shaft 75 has a flat thereon engageable by lever 76 for rotation therewith. Spring 78 connected between lever 76 and plate 51 biases lever 76 and therefore shaft 75 toward a neutral position. Pivotally mounted on lever 76 via rivet 76a is link 79. Link 79 has a rivet portion 80 of lever 81 extending therethrough and also through the slotted aperture 68 of adjacent pawl 61. Rivet portion 80 is an extension of lever 81. Rivet portion 80 also extends through plate 51 which is located between lever 81 and pawl 61. Plate 51 has an opening 82 having a slotted generally vertical portion 84 and a slotted generally horizontal portion 85. Spring 87 extending through a hole in link 79 and into similar construction in cover 52 urges link 79 and therefore the rivet portion 80 of lever 81 toward the junction of the vertical and horizontal portions 84 and 85 of opening 82.

For connection of latch mechanism 17 to the control system for operating the tail gate 10 about a horizontal axis, rod 33 extends through an opening in lever member 81 and into similar construction in extension 32 of bellcrank assembly 27. Similarly, rod 49 extends through an opening in lever 76 and connects same to arm 48 of second remote control assembly 42 for operation of tail gate 10 about a vertical axis.

Inasmuch as the operation of tail gate 10 about a vertical axis also requires the unlatching of lower right latchable hinge 16, mechanism 17 is provided with a lever 88 fixedly attached to shaft 75. Link 89 is pivotally connected at one end to lever 88 and has its other end adapted for an adjustable connection to lower right latchable hinge 16 for actuation thereof.

OPERATION OF THE MECHANISM

In operation, the glass 12 of station wagon 11 is first lowered into tail gate 10. As the bottom of glass 12 approaches its lowest position it contacts rod (which may be a wire) 74 and moves same downward. Since rod 74 is connected to lever 71 it moves same from its normal blocking position relative to pawl 61, against the action of spring 73, thereby freeing the pawl 61 for movement from rotor 55.

If it is desired to open tail gate 10 as a door about a generally VERTICAL axis, handle 46 is rotated upward from the neutral position. Movement of handle 46 then causes inter-connected stud 45 and arm 48 to rotate which places rod 49 under tension. Rod 49 then rotates lever 76 connected thereto against the action of spring 78. Movement of lever 76 then causes movement of link 79 pivotally mounted thereon. As link 79 is rotated upward, it moves rivet portion 80 of lever 81 upward in vertical portion 84 of opening 82. Since rivet portion 80 also extends through slotted aperture 68 of pawl 61, pawl 61 is caused to rotate about pin 64 away from rotor 55 thereby allowing spring 62 to move same to the unlatched position. Simultaneously with rotation of lever 76 and shaft 75, attached thereto, lever 88 rotates and lifts link 89 which unlatches lower right latchable hinge 16. Tail gate 10 can then be rotated about the generally vertical axis to the open position. Suitable door checks (not shown) can be provided to retain tail gate 10 in the full open position. It is to be noted that although the various springs in the linkages are urging the associated members toward their normal neutral position upon the release of handle 46, handle 24 for horizontal positioning of tail gate 10 cannot be actuated because rivet portion 80 remains in vertical portion 84 of opening 82. Until rotor 55 is again moved to the latched position and out of the way of pawl 61, which can then rotate downward to its latched position, rivet portion 80 will remain in the vertical portion 84 of opening 82. Also it is to be noted that a considerable force is necessary to move rotor 55 to its latched position because pawl 61 is held firmly against same by pawl spring 65 and of course rotor spring 62 biases rotor 55 to the unlatched position. Of course, swinging the heavy tail gate 10 to the closed position easily causes rotor 55 to become latched when contact is made with striker 58.

To open tail gate 10 to the HORIZONTAL position requires the previous lowering of glass 12 into tail gate 10 as before. Since the mechanism thereof is not a part of this invention, same is not shown. Upon rotation of inside handle 24 upward, stud 21 and arm 22 attached thereto are caused to rotate. Arm 22 causes rod 34 to rotate arm 30 of bellcrank assembly 27. Movement of arm 30 via flange 40 rotates arm 35. Arm 35 draws rod 36 thereto which opens upper left latchable hinge assembly 15. Movement of arm 30 also rotates extension 32 which pulls rod 33 connected thereto toward bellcrank assembly 27. Rod 33 since connected to lever 81 having rivet portion 80 pulls same along horizontal portion 85 of opening 82. Rivet portion 80 since extending into slotted aperture 68 of pawl 61 will cause same to rotate upward away from rotor 55 freeing same to move into the unlatched position. It is to be noted that rivet portion 80 will remain in horizontal portion 85 of opening 82 until rotor 55 is moved to the latched position and out from under pawl 61. As a consequence, handle 46, lever 76 and link 79, for operation of tail gate 10 about a vertical axis cannot be actuated until rivet portion 80 again has moved to the junction of portions 84 and 85 of opening 82. Simultaneous operation of handles 24 and 46 is not possible since rivet portion 80 must move into either portion 84 or 85 of opening 82 for the rotor 55 to be unlatched.

Although not shown, a suitable cable attached between the left door jam of wagon 11 and the tail gate 10 may be used to maintain the tail gate in a horizontal open position. Also, a torsion rod (not shown) connected between the tail gate 10 and the vertical portion of lower left hinge 14 may be used to provide an assist to return the tail gate to latched position while allowing the rotation of the tail gate as a door.

Having thus described the invention it will be apparent to those skilled in the art that various modifications and changes can be made without departing from the spirit of the invention or the scope of the appended claims.

What is claimed is:
1. A latch mechanism comprising:
 (a) a support plate, said plate having an opening therethrough, said opening having at least two diverging, generally elongated portions whose axes are not collinear;
 (b) a rotor rotatably mounted on said plate, said rotor having a generally forked portion adapted to engage a striker therebetween, said rotor having a detent adapted for engagement by a pawl;
 (c) a pawl rotatably mounted on said plate, said pawl having a slotted aperture therethrough, said pawl having a pawl detent adapted for engaging said rotor detent;
 (d) a first lever rotatably mounted on said plate;
 (e) a link pivotally mounted on said first lever; and
 (f) a second lever having a rivet portion, said rivet portion extending through said opening in said plate and said pawl aperture and pivotally connected to said link, said rivet portion being adapted to move said pawl to release said rotor upon movement into one portion of said plate opening by said first lever and said link and by movement into said other portion of said plate opening by said second lever, movement of said rivet portion into either portion of said plate opening thereby blocking movement of the non-actuating lever.

2. The latch mechanism of claim 1 further comprising: first spring means for biasing said rotor to an open position for releasing the striker and second spring means for biasing said pawl toward said rotor.

3. The latch mechanism of claim 1 in which said rotor and pawl are mounted on said plate at an angle of approximately 90° therebetween.

4. The latch mechanism of claim 3 further comprising: third spring means for biasing said first lever, link and therefore said rivet portion to the junction of said portions of said plate opening and fourth spring means for biasing said link and therefore said rivet portion to the junction of said portions of said plate opening.

5. A latch mechanism adapted for use with a vehicle dual action tail gate of the type wherein the tail gate glass is movable between the tail gate and the vehicle body, said latch mechanism comprising:
 (a) a support plate adapted to be mounted on the tail gate, said plate having an opening therethrough, said opening having at least two diverging, generally elongated portions whose axes are not collinear;
 (b) a rotor rotatably mounted on said plate, said rotor having a generally forked portion adapted to engage a vehicle mounted striker therebetween, said rotor having a detent adapted for engagement by a pawl;
 (c) a pawl rotatably mounted on said plate, said pawl having a slotted aperture therethrough, said pawl having a pawl detent adapted for engaging said rotor detent;
 (d) a first lever rotatably mounted on said plate;
 (e) a link pivotally mounted on said first lever;
 (f) a second lever having a rivet portion, said rivet portion extending through said opening in said plate and said pawl aperture and pivotally connected to said link, said rivet portion being adapted to move said pawl to release said rotor upon movement into one portion of said plate opening by said first lever and said link and by movement into said other portion of said plate opening by said second lever, movement of said rivet portion into either portion of said plate opening thereby blocking movement of the non-actuating lever; and
 (g) means for blocking movement of the pawl from the latched position, said means being adapted to be actuated by the tail gate glass when in the substantially lowered position to move same from the blocking position.

6. The latch mechanism of claim 5 further comprising: a third lever rotatably mounted on said plate for movement with said first lever, and a second link pivotally mounted on said third lever, said second link being adapted to be connected to a latchable hinge of the tail gate.

7. The latch mechanism of claim 6 further comprising: first spring means for biasing said rotor to an open position for releasing the striker, second spring means for biasing said pawl toward said rotor, third spring means for biasing said first lever, link and therefore said rivet portion to the junction of said portions of said plate opening and fourth spring means for biasing said link member and therefore said rivet portion to the junction of said portions of said plate opening.

8. The latch mechanism of claim 7 in which said rotor and pawl are mounted on said plate at an angle of approximately 90° therebetween.

9. The latch mechanism of claim 8 further comprising: control means connected to said first lever for actuating said first lever and therefore said third lever and said second link to release said rotor of said latch mechanism 10. The latch mechanism of claim 9 further comprising: second control means connected to said second lever and adapted to be connected to a second latchable hinge for actuating said second lever to release said rotor of said latch mechanism and the second latchable hinge for movement of the tail gate about a second axis.

References Cited

UNITED STATES PATENTS 3,408,100  10/1968  McKey _____ 292—216

RICHARD E. MOORE, Primary Examiner

U.S. Cl. X.R.

16—147; 292—336.3

UNITED STATES PATENT OFFICE
CERTIFICATE OF CORRECTION

Patent No. 3,519,300        Dated July 7, 1970

Inventor(s)    Thomas J. McKey

It is certified that error appears in the above-identified patent and that said Letters Patent are hereby corrected as shown below:

In column 7, line 10 delete "1" and substitute --2--.

In column 8, line 29 after "mechanism" insert --and a latchable hinge of the tail gate for movement of the tail gate about one axis.--.

SIGNED AND SEALED
NOV 17 1970

(SEAL)
Attest:

Edward M. Fletcher, Jr.
Attesting Officer

WILLIAM E. SCHUYLER, JR.
Commissioner of Patents